US009933781B1

(12) United States Patent
Bando et al.

(10) Patent No.: US 9,933,781 B1
(45) Date of Patent: Apr. 3, 2018

(54) DATA-DRIVEN PLANNING FOR AUTOMATED DRIVING

(71) Applicants: Denso International America, Inc., Southfield, MI (US); DENSO CORPORATION, Kariya, Aichi-pref. (JP); RobotWits LLC, Pittsburgh, PA (US)

(72) Inventors: Takashi Bando, Mountain View, CA (US); Yunfei Xu, Milpitas, CA (US); Maxim Likhachev, Pittsburgh, PA (US); Ellis Marshal Ratner, Pittsburgh, PA (US)

(73) Assignees: DENSO International America, Inc., Southfield, MI (US); DENSO CORPORATION, Kariya, Aichi-pref. (JP); RobotWits, LLC, Pittsburgh, PA (US)

( * ) Notice: Subject to any disclaimer, the term of this patent is extended or adjusted under 35 U.S.C. 154(b) by 0 days.

(21) Appl. No.: 15/359,651

(22) Filed: Nov. 23, 2016

(51) Int. Cl.
*G05D 1/02* (2006.01)
*G01C 21/36* (2006.01)
(Continued)

(52) U.S. Cl.
CPC .......... *G05D 1/0088* (2013.01); *B60W 10/18* (2013.01); *B60W 10/20* (2013.01); *B60W 40/10* (2013.01);
(Continued)

(58) Field of Classification Search
CPC .... G05D 1/0088; G05D 1/021; G05D 1/0212; G01C 21/36; B60W 10/20; B60W 10/18;
(Continued)

(56) References Cited

U.S. PATENT DOCUMENTS 7,734,387 B1   6/2010   Young et al.
8,392,117 B2   3/2013   Dolgov et al.
(Continued)

OTHER PUBLICATIONS

"Sequence Prediction of Driving Behavior Using Double Articulation Analyzer," Taniguchi et al., IEEE, 2015.
(Continued)

*Primary Examiner* — Michael J Zanelli
(74) *Attorney, Agent, or Firm* — Harness, Dickey & Pierce, P.L.C.

(57) ABSTRACT

A system and method are provided and include a subject vehicle having vehicle actuation systems. A driving context database stores driving trends associated with driving locations. A state estimation module determines a current location of the subject vehicle. A global route planner module determines a route to an inputted destination. An action primitive planning module retrieves a driving trend associated with the current location, selects a sequence of action primitives based on the driving trend associated with the current location and based on the determined route, and generates waypoints for the subject vehicle to travel to based on the sequence of action primitives, each waypoint including location coordinates and a direction. A trajectory planner module determines a trajectory for the subject vehicle based on the waypoints. A vehicle control module controls the vehicle actuation systems based on the determined trajectory.

19 Claims, 6 Drawing Sheets

(51) Int. Cl.
    *B60W 10/20* (2006.01)
    *B60W 10/18* (2012.01)
    *B60W 40/10* (2012.01)
    *G05D 1/00* (2006.01)
(52) U.S. Cl.
    CPC .......... *G01C 21/36* (2013.01); *G05D 1/0212* (2013.01); *B60W 2710/18* (2013.01); *B60W 2710/20* (2013.01)
(58) Field of Classification Search
    CPC ............. B60W 40/10; B60W 2710/20; B60W 2710/18
    See application file for complete search history.

(56) References Cited

U.S. PATENT DOCUMENTS

| | | |
|---|---|---|
| 8,634,980 B1 | 1/2014 | Urmson et al. |
| 9,008,890 B1 | 4/2015 | Herbach et al. |
| 9,097,549 B1* | 8/2015 | Rao .................... G01C 21/3461 |
| 9,760,090 B2* | 9/2017 | Shashua ............... G05D 1/0088 |
| 9,760,092 B2 | 9/2017 | Ferguson et al. |
| 2005/0216182 A1 | 9/2005 | Hussain et al. |
| 2014/0172220 A1* | 6/2014 | You ..................... G05D 1/0297 701/23 |
| 2016/0280224 A1* | 9/2016 | Tatourian ............ B60W 30/143 |

OTHER PUBLICATIONS

"Probabilistic planning with clear preferences on missing information," Likhachev et al., Artificial Intelligence, 2008.

"Probabilistic Planning with Clear Preferences on Missing Information," Likhachev et al., University of Pennsylvania Scholarly Commons, 2008.

U.S. Appl. No. 15/451,957, filed Mar. 7, 2017, Denso International America, Inc.

* cited by examiner

DATA-DRIVEN PLANNING FOR AUTOMATED DRIVING

FIELD

The present disclosure relates to systems and methods for data-driven planning for automated driving of a vehicle and, more particularly, to systems and methods for data-driven action planning for automated driving of a vehicle utilizing action-primitive planning with uncertainty.

BACKGROUND

This section provides background information related to the present disclosure, which is not necessarily prior art.

Although systems exist for automated or self-driving vehicles, such systems can have difficulty with decision making in complicated or uncertain situations involving dynamic objects, such as other traffic participants, pedestrians, etc. For example, automated or self-driving vehicles can exhibit seemingly unnatural behavior in certain complicated or uncertain situations involving dynamic objects.

Further, conventional planning for an automated or self-driving vehicle generally includes a route planner and a trajectory planner. The route planner determines a global route plan to a destination and the trajectory planner generates an optimal vehicle path for a short time period, such as several seconds, for following the global route plan. Direct optimization of a vehicle trajectory based on a global route plan with consideration for situational awareness (or naturality) over even a few seconds of trajectory can be difficult to perform due to multiple uncertain factors, such as a surrounding vehicle accelerating rapidly, a pedestrian moving into the vehicle's path, etc. For example, when an obstacle or an uncertain environment is introduced, the traditional trajectory planner may attempt to construct an alternative short-term path. In particularly complicated driving areas with high uncertainty and dynamic objects, however, the trajectory planner may need to frequently and iteratively construct alternative paths and, in such case, the motion planning may become intractable and/or time consuming. Furthermore, purely planning a short term path may lead to collisions since it does not consider uncertainty in the intentions of dynamic obstacles and also does not plan to take actions that disambiguate uncertainty, such as honking to attract the attention of a pedestrian crossing over without looking.

SUMMARY

This section provides a general summary of the disclosure, and is not a comprehensive disclosure of its full scope or all of its features.

The present teachings include systems and methods for data-driven planning for automated driving of a vehicle, including systems and methods for data-driven action planning for automated driving of a vehicle utilizing action-primitive planning with uncertainty.

The present teachings include a system comprising an action primitive database that stores a listing of possible actions for a subject vehicle having vehicle actuation systems including at least one of a steering system, a braking system, a throttle system, a horn system, a headlight system, and a turn signal system. The system also includes a driving context database that stores driving trends, each driving trend associated with a driving location. The system also includes a controller having a state estimation module, a global route planner module, an action primitive planning module, a trajectory planner module, and a vehicle control module. The state estimation module determines a current state of the subject vehicle, the current state of the vehicle including a current location of the subject vehicle. The global route planner module determines a route to an inputted destination, the determined route including a plurality of road segments. The action primitive planning module (i) receives the current location, (ii) retrieves a driving trend associated with the current location from the driving context database based on the current location of the subject vehicle, (iii) selects a sequence of action primitives from the action primitive database based on the driving trend associated with the current location and based on the determined route to the inputted destination, and (iv) generates a plurality of waypoints for the subject vehicle to travel to based on the sequence of action primitives, each waypoint including location coordinates and a direction. The trajectory planner module determines a trajectory for the subject vehicle based on the plurality of waypoints. The vehicle control module controls at least one of the vehicle actuation systems based on the determined trajectory.

The present teachings also include a method comprising storing, with an action primitive database, a listing of possible actions for a subject vehicle having vehicle actuation systems including at least one of a steering system, a braking system, a throttle system, a horn system, a headlight system, and a turn signal system. The method also includes storing, with a driving context database, driving trends, each driving trend associated with a driving location. The method also includes determining, with a state estimation module of a controller, a current state of the subject vehicle, the current state including a current location of the subject vehicle. The method also includes determining, with a global route planner module of the controller, a route to an inputted destination, the determined route including a plurality of road segments. The method also includes receiving, with an action primitive planning module of the controller, the current location. The method also includes retrieving, with the action primitive planning module, a driving trend associated with the current location from the driving context database based on the current location of the subject vehicle. The method also includes selecting, with the action primitive planning module, a sequence of action primitives from the action primitive database based on the driving trend associated with the current location and based on the determined route to the inputted destination. The method also includes generating, with the action primitive planning module, a plurality of waypoints for the subject vehicle to travel to based on the sequence of action primitives, each waypoint including location coordinates and a direction. The method also includes determining, with a trajectory planner module of the controller, a trajectory for the subject vehicle based on the plurality of waypoints. The method also includes controlling, with a vehicle control module of the controller, at least one of the vehicle actuation systems based on the determined trajectory.

The present teachings also include a system comprising a server in communication with a plurality of data-collection vehicles driven by human driver that each communicate vehicle data and associated location data to the server, the vehicle data including data from a steering system, a throttle system, a braking system, a vehicle speed sensor, and a vehicle acceleration sensor. The server includes an action primitive estimation module that receives from each data-collection vehicle, for a plurality of time intervals, steering angle data from the steering system, throttle position data from the throttle system, braking position data from the braking system, vehicle speed data from the vehicle speed sensor, and vehicle acceleration data from the vehicle acceleration sensor and that determines an action primitive for the data-collection vehicle associated with a particular time interval and a particular location, the action primitive corresponding to a driving action being performed by the data-collection vehicle at the particular time interval and at the particular location, and wherein the server stores the determined action primitive in an action primitive database.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To address the above issues with conventional approaches, the present teachings include an intermediate action-primitive planner between the global route or path planner and the local trajectory planner. As discussed in further detail below, the action-primitive planner plans with and accounts for uncertainty in its computations. In the present teachings, an action primitive is represented by a discrete symbol or symbols and corresponds to a specific trajectory or action sequence of actual driving behavior. Examples of action primitives according to the present teachings may include particular elements or actions of actual driving behavior, such as: proceed forward at the current speed, turn right; turn left; change lanes to the left; change lanes to the right; lane keeping; follow the preceding vehicle; accelerate; decelerate; come to a stop; honk the horn, flash the headlights, turn on the right turn signal, turn on the left turn signal, etc. In addition, the action primitives may also include focusing perception resources onto a particular object or area. For example, a particular pedestrian may be near a cross-walk or other area and could decide to walk into a path of the vehicle. An action primitive could correspond to focusing perception resources onto that particular pedestrian by dedicating increased computational resources into tracking that particular pedestrian and/or by directing movable environmental sensors, such as cameras, Lidar sensors, stereo sensors, radar sensors, ultrasonic sensors, etc., towards that particular pedestrian. In this way, the system could track the particular pedestrian or object in a high fidelity mode while tracking other pedestrians or objects in a low fidelity mode.

The action-primitive planner (also referred to as a discrete planner or a robust intelligence planner) can output planned motion/action for a subject vehicle as a discrete sequence of action primitives. Because a discrete sequence search problem can be solved much faster and efficiently than a continuous optimization problem, the action-primitive planner according to the present teachings can more quickly and efficiently deal with multiple hypotheses and better accommodate for the uncertainty of the dynamic objects and uncertain environments. As discussed in further detail below, the generated discrete sequence of action primitives can then be outputted to a trajectory planner to generate a continuous vehicle trajectory based on the action-primitive sequence.

The present teachings also include a large-scale driving behavioral database with data collected from vehicles driven in actual road environments. The large-scale driving behavioral database is used, for example, to achieve more natural action planning in actual road environments. For example, in the present teachings action primitives are represented as discrete symbols, which can provide easy extraction of data-driven knowledge from the large-scale driving behavioral database via symbol frequency while accounting for driving situation context. Further, the system can set a higher relative priority to natural action primitives suited to a current particular driving situation, as previously exhibited by action primitives selected by human drivers in similar driving situations and/or locations.

As such, the present teachings include the use of the action-primitive planner as an intermediate layer between the global route or path planner and the local trajectory planner and the use of a large-scale driving behavior database, which results in more efficient and natural action planning, even during complicated driving environments with dynamic objects and uncertain conditions.

Whereas a deterministic planner must assume a single intention for dynamic obstacles (i.e. pedestrians, vehicles, etc.) in the environment, the action-primitive planner of the present teachings can take multiple hypothesized intentions for each, with an associated probability distribution that indicates the likelihood of each intention being correct. Using this distribution over intentions for each dynamic obstacle, the action-primitive planner can compute a plan that minimizes the expected cost (or risk). In contrast, a deterministic planner produces a least-cost plan under the assumption of a single intention for each dynamic obstacle. Such a least-cost plan is more brittle than a plan that minimizes expected cost, especially under highly uncertain conditions. For a deterministic planner, each action assumes a single deterministic outcome. This assumption breaks down in uncertain environments. When taking into account multiple intentions, on the other hand, the action-primitive planner reasons about multiple outcomes of each action. For example, the action of driving past a pedestrian on the sidewalk may have different outcomes depending on whether the pedestrian intends to wait for the vehicle to pass or intends to dash across the road in front of it. Consequently, the action-primitive planner may produce a different plan depending on whether the probability that the pedestrian crosses in front of the vehicle is 1% or 40%, whereas a typical deterministic planner ignores these probabilities and produces the same plan. The action-primitive planner employs an efficient planning algorithm, based on Probabilistic Planning with Clear Preferences (PPCP), to overcome the additional computational expense of planning with multiple intentions, while still realizing the benefits of producing a robust plan under uncertainty.

Figure 1:
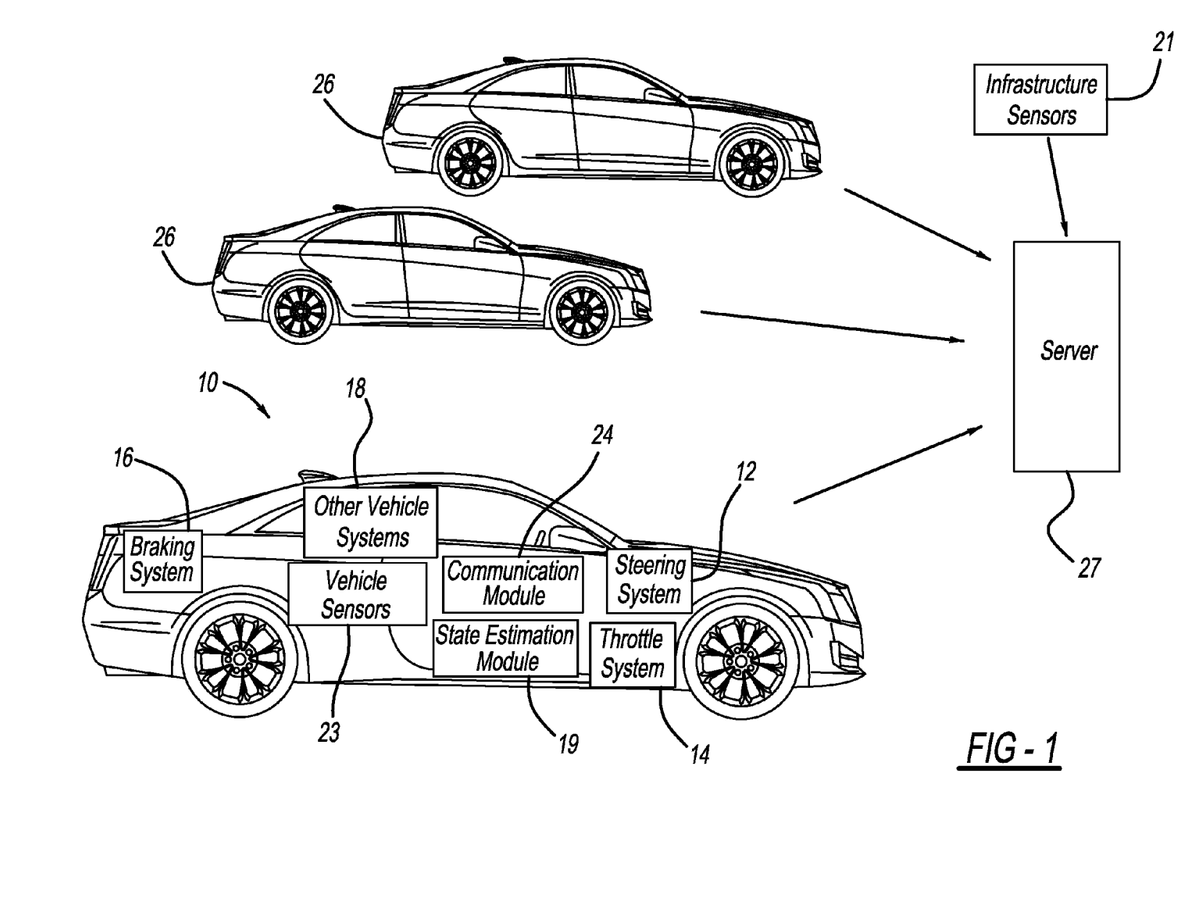
FIG. 1 illustrates multiple data-collection vehicles in communication with a data-collection server according to the present teachings.

With reference to FIG. 1, a system for collecting driving data from multiple vehicles is illustrated and includes data-collection vehicles 10, 26. Although the data-collection vehicles 10, 26 are illustrated as automobiles in FIG. 1, the present teachings apply to any other suitable vehicle, such as a sport utility vehicle (SUV), a mass transit vehicle (such as a bus), or a military vehicle, as examples. While particular details are shown for the data-collection vehicle 10, the other data-collection vehicles 26 include similar systems, sensors, and modules.

The data-collection vehicle 10 includes a steering system 12 for steering the data-collection vehicle 10, a throttle system 14 for accelerating and propelling the data-collection vehicle 10, and a braking system 16 for decelerating and stopping the data-collection vehicle 10. The data-collection vehicle 10 includes other vehicle systems 18, which may include, for example, a horn system, a headlight system, a turn signal system, etc. With additional reference to FIG. 2, the steering system 12, the throttle system 14, the braking system 16, and the other vehicle systems 18 are grouped as vehicle actuation systems 17. The data-collection vehicle 10 also includes vehicle sensors 23, which can include a global positioning system GPS and inertial measurement unit (GPS/IMU) that determines location and inertial/orientation data of the data-collection vehicle 10. Additionally or alternatively, an image navigation system may be used in addition to or in place of the GPS. The image navigation system, for example, may determine a location of the data-collection vehicle 10 based on image data collected from cameras, Lidar sensors, stereo sensors, radar sensors, ultrasonic sensors, or other sensors of the data-collection vehicle 10. The vehicle sensors 23 can also include a vehicle speed sensor that generates data indicating a current speed of the data-collection vehicle 10 and a vehicle acceleration sensor that generates data indicating a current rate of acceleration or deceleration of the data-collection vehicle 10. The data-collection vehicle 10 also includes a communication module 24 that communicates data from the data-collection vehicle 10 to a server 27.

As shown in FIG. 1, additional data-collection vehicles 26 are also in communication with the server. The additional data-collection vehicles 26 each include similar systems, sensors, and modules as described above for the data-collection vehicle 10 and each communicate data from the data-collection vehicles 26 to the server 27. The server 27 is also in communication with infrastructure sensors 21. The infrastructure sensors 21, for example, may include stationary sensors located in a driving environment, such as cameras, Lidar sensors, stereo sensors, radar sensors, ultrasonic sensors, or other sensors that are located, for example, on or near lighting structures, traffic signals, intersections, etc. The infrastructure sensors 21 can communicate collected data related to the data-collection vehicles 10 in the particular driving environments to the server 27.

The data-collection vehicle 10 also includes a state estimation module 19 that determines or estimates a current state of the data-collection vehicle 10 based on data from the vehicle actuation systems 17 and the vehicle sensors 23 of the data-collection vehicle 10. For example, the state estimation module 19 can determine and/or receive location and inertial data indicated by the GPS/IMU and/or the image navigation system, the current steering angle indicated by the steering system 12, the current position of the throttle indicated by the throttle system 14, the current position of the brake indicated by the braking system 16, the current speed of the vehicle indicated by the vehicle speed sensor, the current acceleration/deceleration of the vehicle indicated by the vehicle acceleration sensor, and/or the current state of the other vehicle systems 18, such as the current state of the horn system, the headlight system, the turn signal system, etc.

The data-collection vehicles 10, 26 and/or infrastructure sensors 21 communicate information to the server 27 regarding the current state of the data-collection vehicles 10, 26, as determined or estimated by the state estimation module 19. For example, the state estimation module 19 can communicate the location and inertial data, the current steering angle, the current position of the throttle, the current position of the brake, the current speed of the vehicle, the current acceleration/deceleration of the vehicle, and/or the current state of the other vehicle systems 18, such as the current state of the horn system, the headlight system, the turn signal system, etc., to the server 27.

Figure 2:
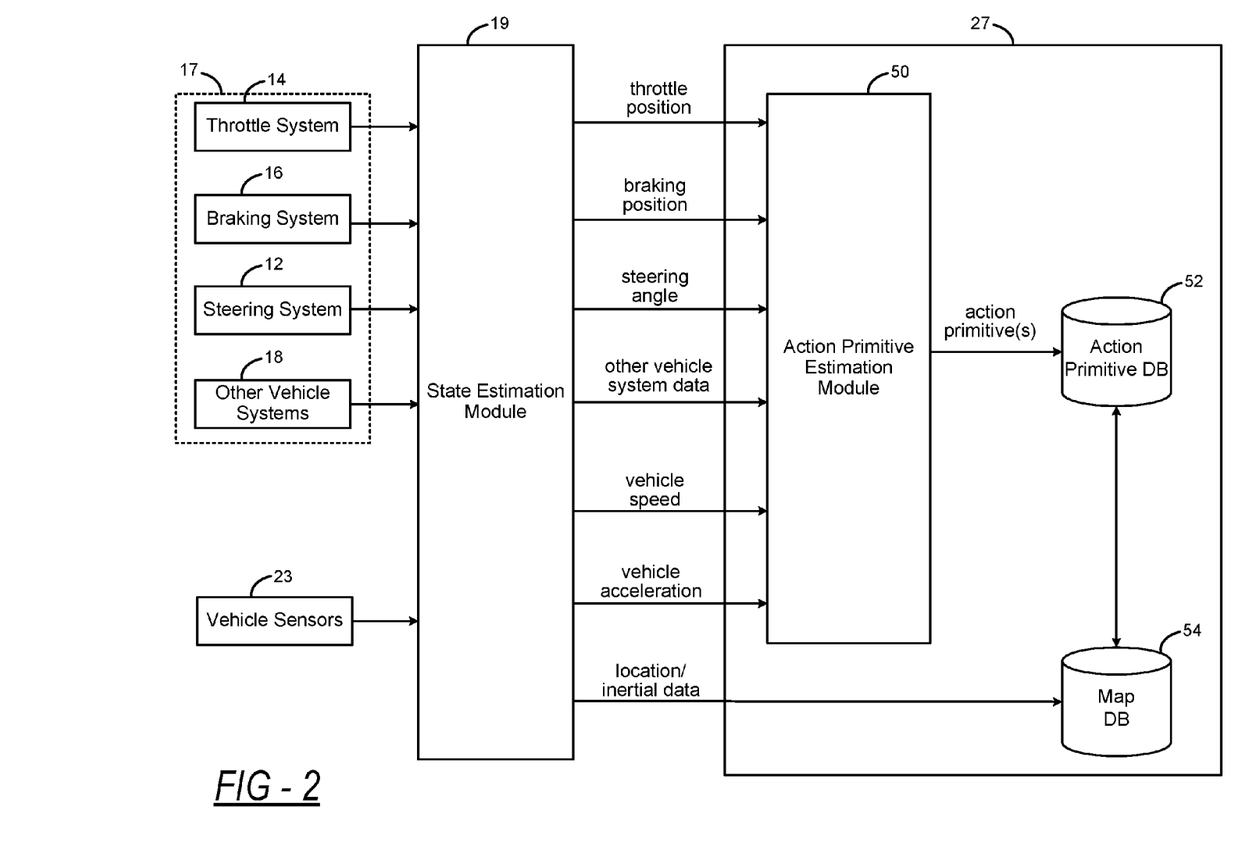
FIG. 2 illustrates a block diagram of a system according to the present teachings for collecting data from the multiple data-collection vehicles.

With additional reference to FIG. 2, the server 27 can include an action primitive estimation module 50, an action primitive database 52, and a map database 54. As shown in FIG. 2, the action primitive estimation module 50 receives the throttle position, the braking position, the steering angle, other vehicle system data, the vehicle speed, and the vehicle acceleration/deceleration from the state estimation module 19 of the data-collection vehicle and the map database 54 receives the location/inertial data from the state estimation module 19 of the data-collection vehicle 10.

The action primitive estimation module 50 receives and analyzes the vehicle data from the data-collection vehicles 10, 26 and generates discrete action primitives associated with each of the data-collection vehicles 10, 26 at discrete time intervals, such as two to three seconds. Shorter or longer time intervals can alternatively be used for determining the action primitives. For example, at a given time interval, based on analyzing the throttle position, braking position, steering angle, other vehicle system data, vehicle speed, and vehicle acceleration/deceleration, the action primitive estimation module 50 can determine that the data-collection vehicle 10, at the given time interval is, performing a particular action or driving maneuver. For example, at a given time interval, based on the received data, the action primitive estimation module 50 may determine that the data-collection vehicle is performing one of the action primitives, such as: turning right; turning left; changing lanes to the left; changing lanes to the right; following the preceding vehicle; accelerating; decelerating; coming to a stop; honking the horn, flashing the headlights, turning on the right turn signal, turning on the left turn signal, etc. The server 27 stores a predetermined symbol for each of the possible action primitives. As such, for each given time interval, the action primitive estimation module 50 can determine the applicable action primitive symbol corresponding to the determined action primitive, based on the received data, and can store the action primitive symbol, along with an identification of the associated data-collection vehicle 10, 26 and the associated time interval for the particular action primitive in the action primitive database 52. The server 27 can also store the location/inertial data from the state estimation module 19 with associated timestamp data in a map database 54. The action primitive database 52 and the map database 54 can be relational databases, indexed based on time interval data, location/inertial data, and action primitive symbol data.

In this way, the server 27 can collect vehicle data from multiple data-collection vehicles 10, 26 over time and build up large collections of action primitive and location/inertial datasets stored in the action primitive database 52 and the map database 54. For example, data-collection vehicles 10, 26, such as those illustrated in FIG. 1, may be deployed and driven by multiple different human drivers in a given area over time to build up the action primitive database 52 and the map database 54 with actual driving and vehicle data. For example, data-collection vehicles 10, 26 may be driven in given geographic area, such as a city, county, country, etc., over a predetermined time period, such as a number of weeks, months, or years, to collect vehicle data and build up the action primitive database 52 and the map database 54. Due to the relational nature of the databases, the data can be queried and analyzed to view particular action primitives for vehicles at a particular location, at a particular time, and/or over a particular time period.

While shown in FIG. 2 as part of the server 27, the action primitive estimation module 50 could alternatively be implemented within the data-collection vehicles 10, 26. In such case, the data-collection vehicles 10, 26 could communicate the action primitive data, such as the applicable action primitive symbols for given time intervals, along with the location/inertial data, through the communication module 24 to the server 27 for storage in the action primitive database 52 and the map database 54.

Figure 3:
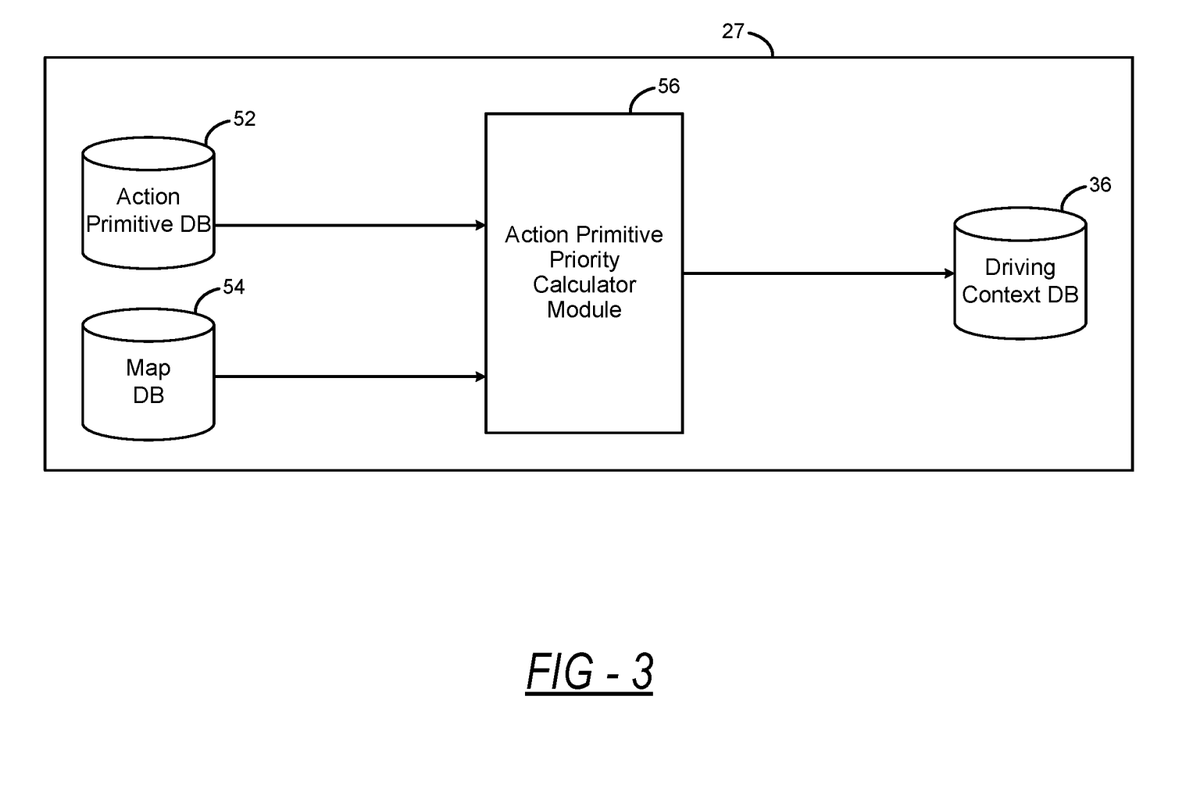
FIG. 3 illustrates a block diagram of a system for generating driving context data based on the collected data from the multiple data-collection vehicles.

With reference to FIG. 3, the server 27 can also include an action primitive priority calculator module 56 and a driving context database 36. The action primitive priority calculator module 56 can receive and analyze the action primitive and location data from the action primitive database 52 and the map database 54 to determine action primitive trends and driving tendencies associated with particular locations. For example, the action primitive priority calculator module 56 may determine for a particular location that "right lane vehicles in this intersection frequently turn right," or that "after 8 am, vehicles tend to change lanes and overtake low-speed vehicles." For additional example, the action primitive priority calculator module 56 may determine for a particular location that "vehicles tend to accelerate after turning onto this section of road," or that "vehicles tend to decelerate when approaching this location."

In particular, the action primitive priority calculator module 56 can analyze the frequency of particular action primitives at particular locations and times and determine driving trends. For example, the action primitive priority calculator module 56 can store action primitive trends as driving contexts, based on the frequency of the action primitives. The driving contexts can be stored in the driving context database 36 and represented as a priority of action primitive sequences. For example, frequent transition patterns of action primitives can be obtained from analysis of the action primitive database 52 and the map database 54. From the frequency of the action primitive transition patterns, the action primitive priority calculator module 56 can determine, for example, information about a driver-group (such as how often specific action primitives can be observed while members of a driver-group are driving), and geo-context information (such as, in this intersection, drivers turn right more frequently than other intersections in this area), etc. The action primitive priority calculator module 56 can assign priorities of action primitives/action primitive transition patterns, which are determined as normalized coefficients proportional to the frequency of the action primitive/action primitive transition pattern.

Once established based on a sufficient amount of collected data, the driving context database 36 can be used in action planning by autonomous or semi-autonomous vehicles.

Figure 4:
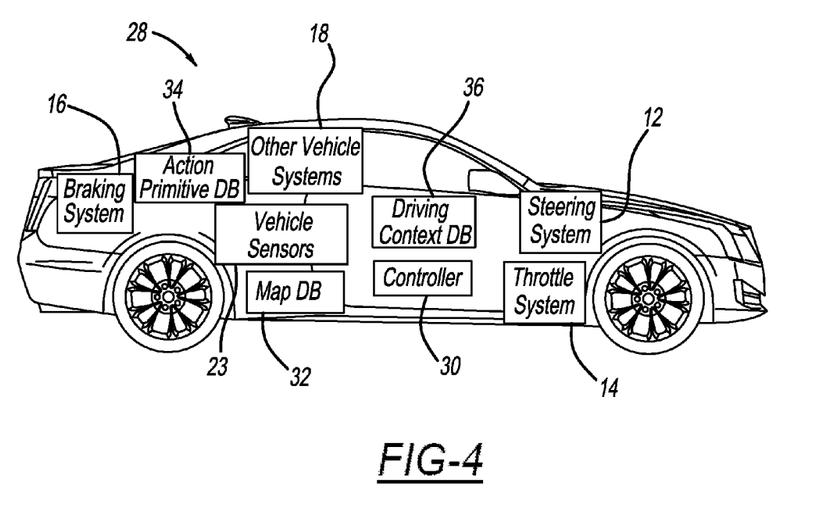
FIG. 4 illustrates a subject vehicle with a system for data-driven action planning according to the present teachings.

With reference to FIG. 4, a self-driving vehicle 28 is illustrated. The self-driving vehicle 28 includes the steering system 12, the throttle system 14, the braking system 16, and other vehicle systems 18, as described above with reference to FIGS. 1 and 2 and data-collection vehicle 10. The self-driving vehicle 28 also includes the vehicle sensors 23, described above with reference to FIGS. 1 and 2 and data-collection vehicle 10. For example, the vehicle sensors 23 of the self-driving vehicle 28 can include a GPS/IMU and/or image navigation system, a vehicle speed sensor, and/or vehicle acceleration sensor, as described above. In the self-driving vehicle 28 of FIG. 4, however, the steering system 12, throttle system 14, braking system 16, and other vehicle systems 18 can be operated by a controller 30 to drive the self-driving vehicle 28. The vehicle sensors 23 of the self-driving vehicle 28 may also include a number of environmental sensors to sense information about the surroundings of the self-driving vehicle 28. For example, the vehicle sensors 23 may include an image sensor, such as a camera, mounted to a roof of the self-driving vehicle 28. The self-driving vehicle 28 may be equipped with additional image sensors at other locations on or around the self-driving vehicle 28. Additionally, the self-driving vehicle 28 may be equipped with one or more front sensors located near a front bumper of the self-driving vehicle 28, one or more side sensors located on side mirrors or side doors of the self-driving vehicle 28, and/or one or more rear sensors located on a rear bumper of the self-driving vehicle 28. The front sensors, side sensors, and rear sensors may be, for example, Lidar sensors, stereo sensors, radar sensors, ultrasonic sensors, or other sensors for detecting information about the surroundings of the self-driving vehicle 28, including, for example, other vehicles, lane lines, guard rails, objects in the roadway, buildings, pedestrians, etc., Additional environmental sensors may be located on or around the self-driving vehicle. The vehicle sensors 23 may also include sensors to determine the light level of the environment (i.e., whether it is daytime or nighttime), to determine or receive weather data (i.e., whether it is a sunny day, raining, cloudy, etc.), to determine the current temperature, to determine the road surface status (i.e., dry, wet, frozen, number of lanes, types of lane marks, concrete surface, asphalt surface, etc.), and/or other applicable environmental information. The controller 30 receives data about the surroundings of the self-driving vehicle 28 from the vehicle sensors 23 and uses the received data for driving the vehicle, as discussed in further detail below.

The self-driving vehicle 28 also includes a map database 32 and an action primitive database 34. The self-driving vehicle 28 also includes the driving context database 36, as described above. For example, the self-driving vehicle 28 may be installed with a copy of the driving context database 36 from the server 27 at the time of manufacture or subsequent to manufacture. Additionally, the driving context database 36 may be synced with, and periodically updated by, the driving context database 36 stored on the server 27.

The map database 32 includes map data for a geographic area in which the self-driving vehicle 28 is traveling. The action primitive database 34 includes a listing of possible action primitives, i.e., particular elements or actions of actual driving behaviors that the self-driving vehicle 28 can perform. For example, the action primitive database 34 may include action primitives, such as: proceed forward at the current speed; turn right; turn left; change lanes to the left; change lanes to the right; follow the preceding vehicle; accelerate; decelerate; come to a stop; honk the horn, flash the headlights, turn on the right turn signal, turn on the left turn signal, etc.

Figure 5:
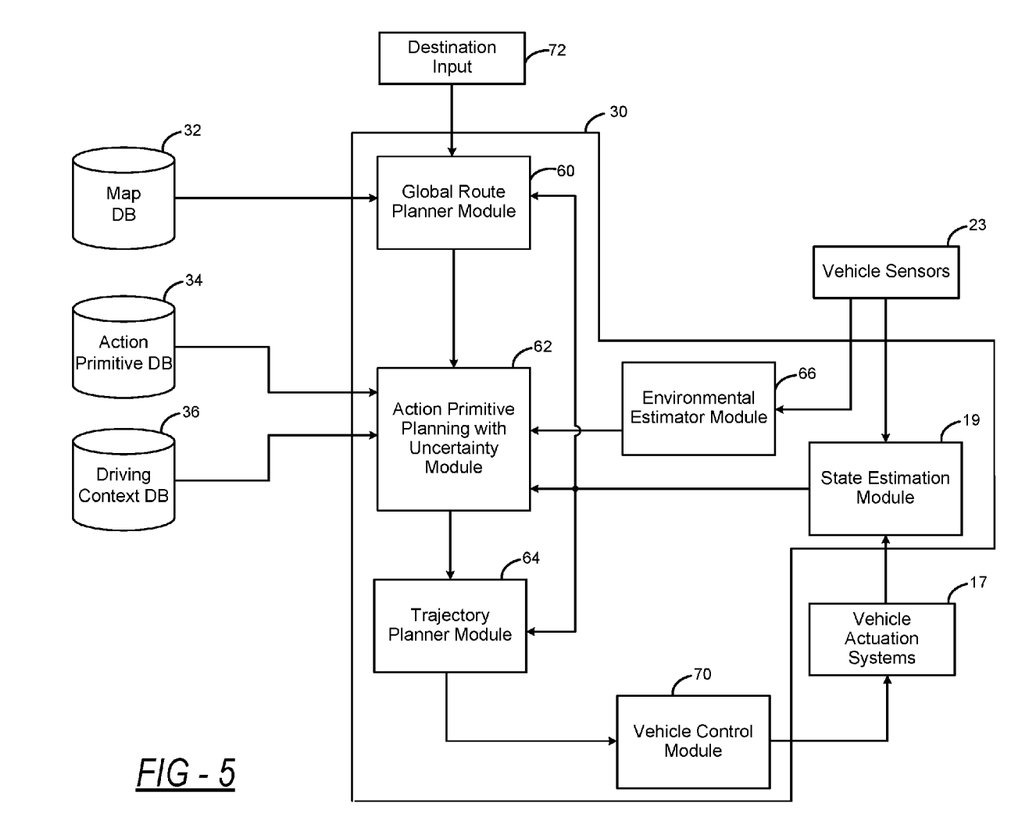
FIG. 5 illustrates a block diagram of the system for data-driven action planning according to the present teachings.

With reference to FIG. 5, certain components of the self-driving vehicle 28 are shown, along with additional details of the controller 30. In FIG. 5, for reference, the steering system 12, the throttle system 14, the braking system 16, and the other vehicle systems 18 are grouped as vehicle actuation systems 17. For further reference, similar to FIGS. 1, 2, and 4, the various sensors discussed above are shown as vehicle sensors 23.

As shown in FIG. 5, the controller 30 includes a global route planner module 60, an action primitive planning with uncertainty module 62, and a trajectory planner module 64. The controller 30 also includes an environmental estimator module 66, a state estimation module 19, and a vehicle control module 70.

The global route planner module 60, for example, receives destination input 72 indicating a destination for the self-driving vehicle 28. The destination input 72 can be received via voice or text input from an operator of the self-driving vehicle 28 or can be received remotely. The global route planner module 60 can receive current location/inertial data of the self-driving vehicle 28 from the state estimation module 68. As discussed above, the state estimation module 19 may determine location/inertial data of the self-driving vehicle 28 based on a GPS/IMU and/or an image navigation system. The global route planner module 60 can determine a route to the inputted destination based on the current location of the self-driving vehicle 28 and based on map data stored in the map database. Additionally, the global route planner module 60 can receive map data remotely. The global route planner module 60, for example, can use conventional route planning to determine and output a series of road segments for the self-driving vehicle 28 to follow, as well as potential alternative road segments with corresponding cost-to-goal. For example, the global route planner module 60 may determine a shortest distance route to the inputted destination from the current location or a shortest time of travel to the inputted destination from the current location and can output one or more series of road segments.

The action primitive planning with uncertainty module 62 receives the determined route from the global route planner module 60 and determines the optimal action primitive sequence for a predetermined upcoming time interval. The predetermined upcoming time interval may be, for example, 30 or 40 seconds. Other predetermined upcoming time intervals, however, may be used. The optimal action primitive sequence, for example, corresponds to the most suited sequence of action primitives given the current driving context.

The action primitive planning with uncertainty module 62 receives data indicating the current state of the self-driving vehicle 28 from the state estimation module 19. As discussed above, the state estimation module 19 determines the current state of the self-driving vehicle 28 based on data received from the vehicle sensors 23 and the vehicle actuation systems 17.

The action primitive with uncertainty module 62 also receives data from an environmental estimator module 66 indicating information about the surroundings of the self-driving vehicle 28. For example, the environmental estimator module 66 receives data from the vehicle sensors 23, including, for example, the vehicle speed sensor, the vehicle acceleration sensor, the image sensor(s), front sensor(s), the side sensor(s), and/or the rear sensor(s). Based on the data from the vehicle sensors 23, the environmental estimator module 66 determines information about the surroundings of the self-driving vehicle 28. For example, the environmental estimator module 66 may determine that a secondary vehicle is located adjacent to the self-driving vehicle 28, that a pedestrian is located at the corner of an upcoming intersection, that a secondary vehicle in front of the self-driving vehicle 28 is changing lanes, etc. Additionally, the environmental estimator module 66 may determine: the light level of the environment (i.e., whether it is daytime or nighttime), the current weather conditions (i.e., whether it is a sunny day, raining, cloudy, etc.), the current temperature, the road surface status (i.e., dry, wet, frozen, number of lanes, types of lane marks, concrete surface, asphalt surface, etc.), a driver index (indicating whether a driver of a nearby secondary vehicle is an aggressive driver, an evasive driver, a tailgater, etc.), and other surrounding information (such as time-headway/time-to-collision/space-headway to surrounding vehicles, relative/actual velocities of surrounding vehicles, estimated intention of surrounding vehicles, vehicle types of surrounding vehicles, etc.).

The action primitive planning with uncertainty module 62 also receives current location/inertial data of the self-driving vehicle 28 from the state estimation module 68 and accesses the driving context database 36 to determine driving context information associated with the current location of the self-driving vehicle 28. As discussed above, the driving context database 36 can provide driving context information, such as driving context trends, for a particular location, as indicated by the location data from the state estimation module 68. For example, as indicated above, the driving context database 36 may indicate that, for the current location of the self-driving vehicle 28, "right lane vehicles in this intersection frequently turn right," or that "after 8 am, vehicles tend to change lanes and overtake low-speed vehicles." For additional example, the driving context database 36 may indicate that, for the current location of the self-driving vehicle 28, "vehicles tend to accelerate after turning onto this section of road," or that "vehicles tend to decelerate when approaching this location." Based on the current location of the self-driving vehicle 28, the action primitive planning with uncertainty module 62 can retrieve and determine driving context information for the current location, as indicated by the driving context database 36.

The action primitive planning with uncertainty module 62 also accesses a listing of possible action primitives stored in the action primitive database 34. The action primitive database 34 includes a listing of possible action primitives, i.e., particular elements or actions of actual driving behaviors that the self-driving vehicle 28 can perform. For example, the action primitive database 34 may include action primitives, such as: proceed forward at the current speed; turn right; turn left; change lanes to the left; change lanes to the right; follow the preceding vehicle; accelerate; decelerate; come to a stop; honk the horn, flash the headlights, turn on the right turn signal, turn on the left turn signal, etc.

Based on the current state of the self-driving vehicle 28 (as indicated by the state estimation module 19), the information about the surroundings of the self-driving vehicle 28 (as indicated by the environmental estimator module 66), the driving context information associated with the current location of the self-driving vehicle 28 (as retrieved from the driving context database 36), the action primitive planning with uncertainty module 62 selects an optimal sequence of action primitives from the action primitive database 34 for the next upcoming time interval of travel, such as 30 or 40 seconds. As discussed below, the action primitive planning with uncertainty module 62 can use a graph search approach to find the optimal action primitive sequence for the self-driving vehicle 28. For example, an algorithm for probabilistic planning with clear preferences on missing information (as described in "Probabilistic Planning with Clear Preferences on Missing Information," Maxim Likhachev and Anthony Stentz, Artificial Intelligence, Volume 173, Issues 5-6, Advances in Automated Plan Generation, April 2009, Pages 696-721, ISSN 0004-3702, which is incorporated herein by reference) can be used to solve the search problem, with the introduction of priority of action primitives to make the search preference for efficient graph search in an uncertain environment.

Having determined the optimal action primitive sequence for the self-driving vehicle 28, the action primitive planning with uncertainty module 62 then outputs waypoints (i.e., x, y, theta, where x and y are location coordinates for the self-driving vehicle 28 and theta is a direction for the self-driving vehicle 28) for the self-driving vehicle 28 to move towards based on the determined optimal action primitive sequence. The action primitive planning with uncertainty module 62 can also output actions for the other vehicle systems 18 to take, such as honk the horn, flash the headlights, turn on the right turn signal, turn on the left turn signal, etc.

The determined waypoints (x, y, theta) are received by the trajectory planner module 64. The trajectory planner module 64 uses conventional trajectory planning, based on the waypoints (x, y, theta) outputted by the action primitive planning with uncertainty module 62 and based on the next road segments calculated by the global route planner module 60 to determine vehicle trajectories for the self-driving vehicle 28, represented as a series of (x, y, theta, v), where x and y are location coordinates for the self-driving vehicle 28, theta is a direction for the self-driving vehicle 28, and v is a velocity for the self-driving vehicle 28. In this way, the trajectory planner module 64 calculates the trajectory for the self-driving vehicle 28 as a series of (x, y, theta, v) points based on the next road segments calculated by the global route planner and based on the waypoints (x, y, theta) for the self-driving vehicle 28 to move towards, as calculated by the action primitive planning with uncertainty module 62.

The trajectory planner module 64 outputs the trajectory information (i.e., x, y, theta, v) to a vehicle control module 70. The vehicle control module 70 controls the vehicle actuation systems 17 to appropriately drive the vehicle according to the determined trajectories for the self-driving vehicle 28 and to appropriately control the other vehicle systems 18. For example, the vehicle control module 70 controls the steering system 12, throttle system 14, braking system 16, and the other vehicle system 18 to drive and control the self-driving vehicle 28 based on the trajectory and the series of (x, y, theta, v) points determined by the trajectory planner module 64.

In this way, the system can use contextual information for motion planning. In other words, generating driving behavior while considering the context of the driving situation beneficially allows for the self-driving vehicle 28 to efficiently utilize natural motion planning that accommodates complicated and uncertain driving scenarios with dynamic objects. For example, the system can beneficially allow the self-driving vehicle 28 to be driven in driving scenarios with a mixture of self-driven and human-driven vehicles. Discrete representations of time-series driving behavior as action primitives achieves not only efficient motion planning under uncertain road environments, but also introduces contextual driving information via the frequency of action primitives according to vehicle positions, driver characteristics, and surrounding situations. As such, the automated driving by the self-driving vehicle 28 can more closely approximate human-like driving behavior, based on the large-scale collection of human driving information, as represented in the driving context database 36.

Figure 6:
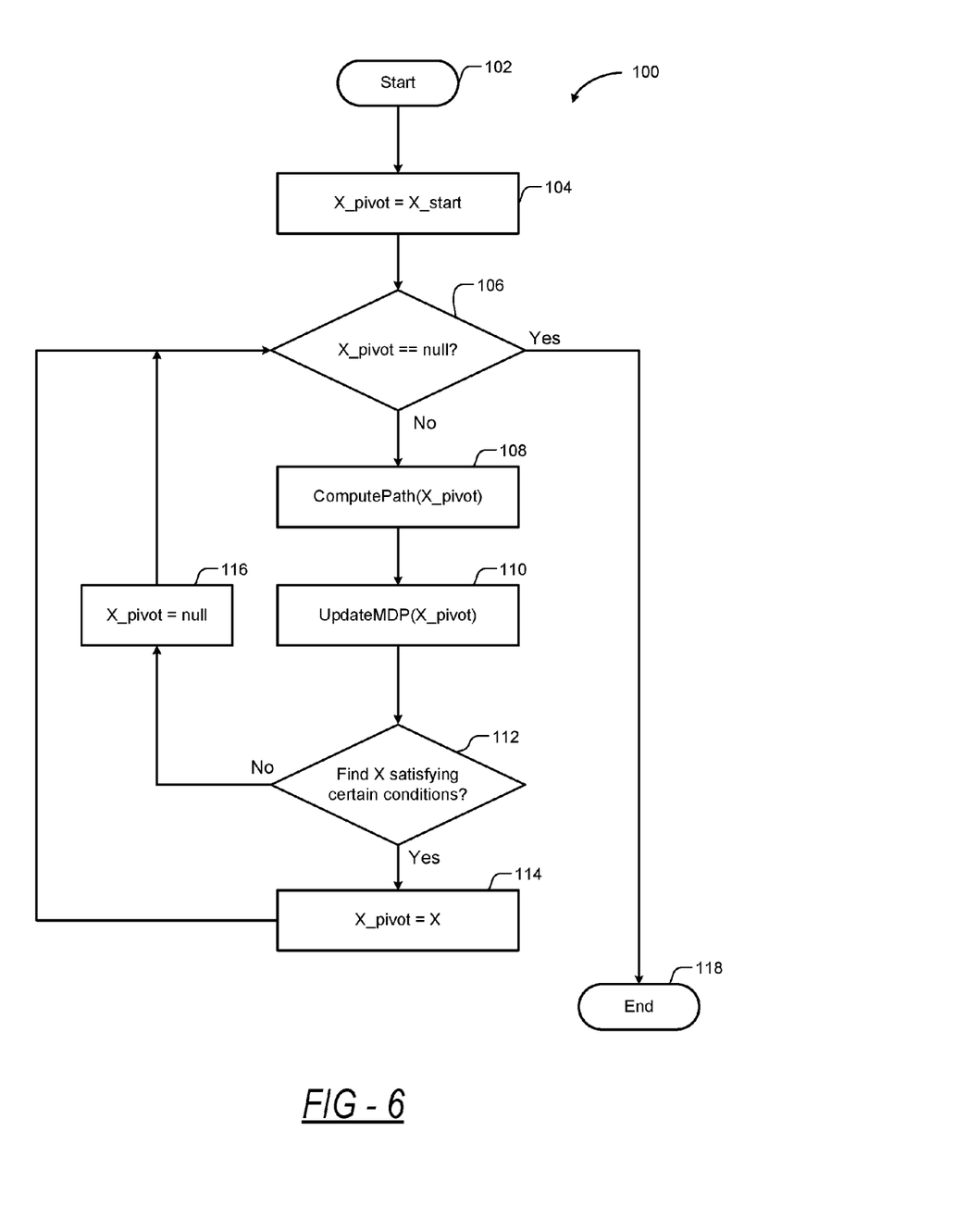
FIG. 6 illustrates a flow diagram for a method of data-driven action planning according to the present teachings.

With reference to FIG. 6, a flow diagram of an algorithm 100 for probabilistic planning with clear preferences (PPCP) on missing information is shown. The existence of clear preferences can be used to construct an efficient planner that solves a vast range of planning problems by running a series of deterministic low-dimensional A*-like searches. By making certain approximating assumptions about the problem, the PPCP algorithm keeps the complexity of each search low and independent of the amount of the missing information. Further, the main function of the PPCP algorithm constructs and refines a policy in the full belief state-space.

The algorithm 100 is performed by the action primitive planning with uncertainty module 62 of the controller 30 to determine the optimal action primitive sequence for the self-driving vehicle 28, based on the driving context and conditions, as discussed above. The algorithm 100 starts at 102. At 104, the action primitive planning with uncertainty module 62 sets a variable X_pivot to be X_start, where X_start corresponds to the current state of the self-driving vehicle 28, as represented by x, y, theta, and v, where x and y are location coordinates for the self-driving vehicle 28, theta is a direction for the self-driving vehicle 28, and v is a velocity for the self-driving vehicle 28. The state X_start additionally includes the current belief about (probability distribution over) the intentions of surrounding dynamic objects of the self-driving vehicle 28. At 106, the action primitive planning with uncertainty module 62 determines whether X_pivot is equal to "null." At 106, when X_pivot is equal to null, the algorithm ends at 118. At 106, when X_pivot does is not equal to null, the action primitive planning with uncertainty module 62 proceeds to 108.

At 108, the action primitive planning with uncertainty module 62 executes the ComputePath function based on X_pivot. The ComputePath function performs a backward deterministic A*-like search. The ComputePath function makes use of clear preferences for the unknown information, such as the intentions of surrounding dynamic objects, in order to perform a deterministic low-dimensional A*-like search. Formally, a clearly preferred value b for the unknown information h is a value such that for any belief-state X and any action a where h is unknown, there exists a successor belief-state X' where h=b and satisfies $$X' = \mathrm{argmin}_{Y \in succ(X, a)} c(X, a, Y) + v^*(Y) \quad \text{(equation 1)}$$

where c(X, a, Y) is the cost of executing action a at belief-state X that results in belief-state Y, v*(Y) is the expected cost of executing an optimal policy at belief-state Y, and succ(X, a) is the set of successor belief-states of X that result when executing action a.

For example, in the driving domain, clear preferences correspond to intended trajectories for dynamic objects that minimize the total cost of the policy. In certain cases where these clearly preferred intentions are not known exactly, it is possible to instead use approximate preferences corresponding to best guesses as to which of the intended trajectories do not interfere with least-cost paths for the autonomous vehicle. For example, for a pedestrian intending to either cross the road or wait on the sidewalk, the clear preference corresponds to the second intention in which the pedestrian remains on the sidewalk and does not interfere with the autonomous vehicle's path.

At 110, after each search, the action primitive planning with uncertainty module 62 performs an UpdateMDP function based on X_pivot. The UpdateMDP function updates the expected cost-to-goal value for each belief-state corresponding to a state along the path found by the deterministic search. At the time of termination, the expected cost of the found policy is bounded from above by the cost of the policy in which the algorithm always forgets the outcome of sensing if it was a preferred outcome. If an optimal policy does not require remembering preferred outcomes, then the policy returned by PPCP is also guaranteed to be optimal. Additional details for the PPCP algorithm are described in "Probabilistic Planning with Clear Preferences on Missing Information," Maxim Likhachev and Anthony Stentz, Artificial Intelligence, Volume 173, Issues 5-6, Advances in Automated Plan Generation, April 2009, Pages 696-721, ISSN 0004-3702, which is incorporated herein by reference, as noted above.

At 112, the action primitive planning with uncertainty module 62 determines whether the algorithm has found a state X satisfying certain conditions. If so, the action primitive planning with uncertainty module 62 proceeds to 114 and sets X_pivot to be the found state X. If not, the action primitive planning with uncertainty module 62 proceeds to 116 and sets X_pivot to null. After both 114 and 116, the action primitive planning with uncertainty module 62 loops back to 106 and determines whether X_pivot is equal to null. The algorithm 100 ends at 118 when X_pivot is equal to null.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

In this application, including the definitions below, the terms "module," "controller," control module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules, controllers, control modules, and systems described herein. In addition, in this application the terms "module," "controller," or "control module" may be replaced with the term "circuit."

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
an action primitive database that stores a listing of possible actions for a subject vehicle having vehicle actuation systems including at least one of a steering system, a braking system, a throttle system, a horn system, a headlight system, and a turn signal system;
a driving context database that stores driving trends, each driving trend associated with a driving location;

a controller having a state estimation module, a global route planner module, an action primitive planning module, a trajectory planner module, and a vehicle control module, wherein:

the state estimation module determines a current state of the subject vehicle, the current state of the vehicle including a current location of the subject vehicle;

the global route planner module determines a route to an inputted destination, the determined route including a plurality of road segments;

the action primitive planning module (i) receives the current location, (ii) retrieves a driving trend associated with the current location from the driving context database based on the current location of the subject vehicle, (iii) selects a sequence of action primitives from the action primitive database based on the driving trend associated with the current location and based on the determined route to the inputted destination, and (iv) generates a plurality of waypoints for the subject vehicle to travel to based on the sequence of action primitives, each waypoint including location coordinates and a direction;

the trajectory planner module determines a trajectory for the subject vehicle based on the plurality of waypoints; and the vehicle control module controls at least one of the vehicle actuation systems based on the determined trajectory.

2. The system of claim 1, further comprising:

at least one vehicle sensor, the at least one vehicle sensor including at least one of a vehicle speed sensor, a vehicle acceleration sensor, an image sensor, a Lidar sensor, a radar sensor, a stereo sensor, and an ultrasonic sensor;

wherein the state estimation module determines the current state of the subject vehicle based on data from the at least one vehicle sensor.

3. The system of claim 1, further comprising:

at least one vehicle sensor, the at least one vehicle sensor including at least one of an image sensor, a Lidar sensor, a stereo sensor, a radar sensor, and an ultrasonic sensor;

wherein the controller further comprises an environmental estimator module that receives data from the at least one vehicle sensor and determines information about a surrounding environment of the subject vehicle; and wherein the action primitive planning module selects the sequence of action primitives from the action primitive database additionally based on the information about the surrounding environment of the subject vehicle.

4. The system of claim 1, wherein the vehicle actuation systems include at least one of the horn system, the headlight system, and the turn signal system and wherein the selected sequence of action primitives includes action primitives to actuate at least one of the horn system, the headlight system, and the turn signal system.

5. The system of claim 1, wherein the driving context database is based on vehicle data and location data collected from a plurality of data-collection vehicles driven by human drivers, the vehicle data including data from at least one of a steering system, a throttle system, a braking system, a horn system, a headlight system, a turn signal system, a vehicle speed sensor, and a vehicle acceleration sensor.

6. The system of claim 5, wherein the vehicle data and location data is communicated from the plurality of data-collection vehicles to a server and wherein the server generates the driving context database based on the vehicle data and location data communicated from the plurality of data-collection vehicles.

7. The system of claim 6, wherein the server determines a plurality of action primitives associated with each data-collection vehicle, each action primitive corresponding to a driving action for the data-collection vehicle at an associated time interval and an associated location of the data-collection vehicle, and wherein the server generates the driving context database by determining the driving trend for the driving location based on a frequency of action primitives at that driving location.

8. A method comprising:

storing, with an action primitive database, a listing of possible actions for a subject vehicle having vehicle actuation systems including at least one of a steering system, a braking system, a throttle system, a horn system, a headlight system, and a turn signal system;

storing, with a driving context database, driving trends, each driving trend associated with a driving location;

determining, with a state estimation module of a controller, a current state of the subject vehicle, the current state including a current location of the subject vehicle;

determining, with a global route planner module of the controller, a route to an inputted destination, the determined route including a plurality of road segments;

receiving, with an action primitive planning module of the controller, the current location;

retrieving, with the action primitive planning module, a driving trend associated with the current location from the driving context database based on the current location of the subject vehicle;

selecting, with the action primitive planning module, a sequence of action primitives from the action primitive database based on the driving trend associated with the current location and based on the determined route to the inputted destination;

generating, with the action primitive planning module, a plurality of waypoints for the subject vehicle to travel to based on the sequence of action primitives, each waypoint including location coordinates and a direction;

determining, with a trajectory planner module of the controller, a trajectory for the subject vehicle based on the plurality of waypoints; and controlling, with a vehicle control module of the controller, at least one of the vehicle actuation systems based on the determined trajectory.

9. The method of claim 8, further comprising:

generating vehicle data with at least one vehicle sensor, the at least one vehicle sensor including at least one of a vehicle speed sensor, a vehicle acceleration sensor, an image sensor, a Lidar sensor, a stereo sensor, a radar sensor, and an ultrasonic sensor; and receiving, with the state estimation module of the controller, the vehicle data;

wherein the state estimation module determines the current state of the subject vehicle based on data from the at least one vehicle sensor.

10. The method of claim 8, further comprising:

generating vehicle data with at least one vehicle sensor, the at least one vehicle sensor including at least one of an image sensor, a Lidar sensor, a stereo sensor, a radar sensor, and an ultrasonic sensor;

receiving, with an environmental estimator module of the controller, the vehicle data; and determining, with the environmental estimator module of the controller, information about a surrounding environment of the subject vehicle;

wherein the environmental estimator module of the controller selects the sequence of action primitives from the action primitive database additionally based on the information about the surrounding environment of the subject vehicle.

11. The method of claim 8, wherein the vehicle actuation systems include at least one of the horn system, the headlight system, and the turn signal system and wherein the selected sequence of action primitives includes action primitives to actuate at least one of the horn system, the headlight system, and the turn signal system.

12. The method of claim 8, wherein the driving context database is based on vehicle data and location data collected from a plurality of data-collection vehicles driven by human drivers, the vehicle data including data from at least one of a steering system, a throttle system, a braking system, a horn system, a headlight system, a turn signal system, a vehicle speed sensor, and a vehicle acceleration sensor.

13. The method of claim 12, wherein the vehicle data and location data is communicated from the plurality of data-collection vehicles to a server and wherein the server generates the driving context database based on the vehicle data and location data communicated from the plurality of data-collection vehicles.

14. The method of claim 13, wherein the server determines a plurality of action primitives associated with each data-collection vehicle, each action primitive corresponding to a driving action for the data-collection vehicle at an associated time interval and an associated location of the data-collection vehicle, and wherein the server generates the driving context database by determining the driving trend for the driving location based on a frequency of action primitives at that driving location.

15. A system comprising:
a server in communication with a plurality of data-collection vehicles driven by human driver that each communicate vehicle data and associated location data to the server, the vehicle data including data from a steering system, a throttle system, a braking system, a vehicle speed sensor, and a vehicle acceleration sensor;

wherein the server includes an action primitive estimation module that receives from each data-collection vehicle, for a plurality of time intervals, steering angle data from the steering system, throttle position data from the throttle system, braking position data from the braking system, vehicle speed data from the vehicle speed sensor, and vehicle acceleration data from the vehicle acceleration sensor and that determines an action primitive for the data-collection vehicle associated with a particular time interval and a particular location, the action primitive corresponding to a driving action being performed by the data-collection vehicle at the particular time interval and at the particular location, and wherein the server stores the determined action primitive in an action primitive database.

16. The system of claim 15, wherein the server further includes an action primitive priority calculator module that analyzes a plurality of action primitives stored in the action primitive database and determines a driving trend for the particular location based on a frequency of action primitives occurring at the particular location and that stores the determined driving trend for the particular location in a driving context database.

17. The system of claim 16, further comprising a subject vehicle that includes a copy of the driving context database and that includes a controller that controls at least one of a steering system, a throttle system, and a braking system of the subject vehicle based on data from the driving context database.

18. The system of claim 17, wherein the controller includes a state estimation module that determines a current location of the subject vehicle, wherein the controller retrieves a driving trend associated with the current location from the driving context database and controls at least one of a steering system, a throttle system, and a braking system of the subject vehicle based on the retrieved driving trend.

19. The system of claim 18, wherein the subject vehicle includes an action primitive database that stores a listing of possible driving actions for the subject vehicle and wherein the controller of the subject vehicle includes an action primitive planning module that selects a sequence of action primitives from the action primitive database based on the driving trend associated with the current location and generates a plurality of waypoints for the subject vehicle to travel to based on the sequence of action primitives, each waypoint including location coordinates and a direction.

* * * * *

UNITED STATES PATENT AND TRADEMARK OFFICE
CERTIFICATE OF CORRECTION

PATENT NO. : 9,933,781 B1  
APPLICATION NO. : 15/359651  
DATED : April 3, 2018  
INVENTOR(S) : Bando et al.

Page 1 of 1

It is certified that error appears in the above-identified patent and that said Letters Patent is hereby corrected as shown below:

On the Title Page

Column 1, (73) Assignees, Line 4, delete "RobotWits, LLC," and insert --RobotWits LLC,-- therefor Signed and Sealed this  
Seventh Day of August, 2018

Andrei Iancu  
*Director of the United States Patent and Trademark Office*